No. 852,007. PATENTED APR. 30, 1907.
R. J. WILSON.
AIR BRAKE APPARATUS.
APPLICATION FILED NOV. 16, 1905.
2 SHEETS—SHEET 1.
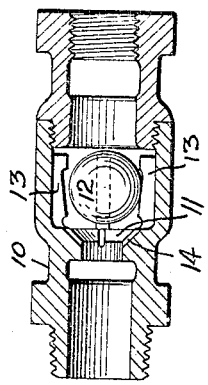
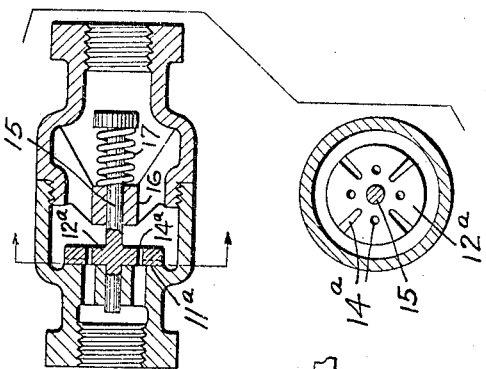
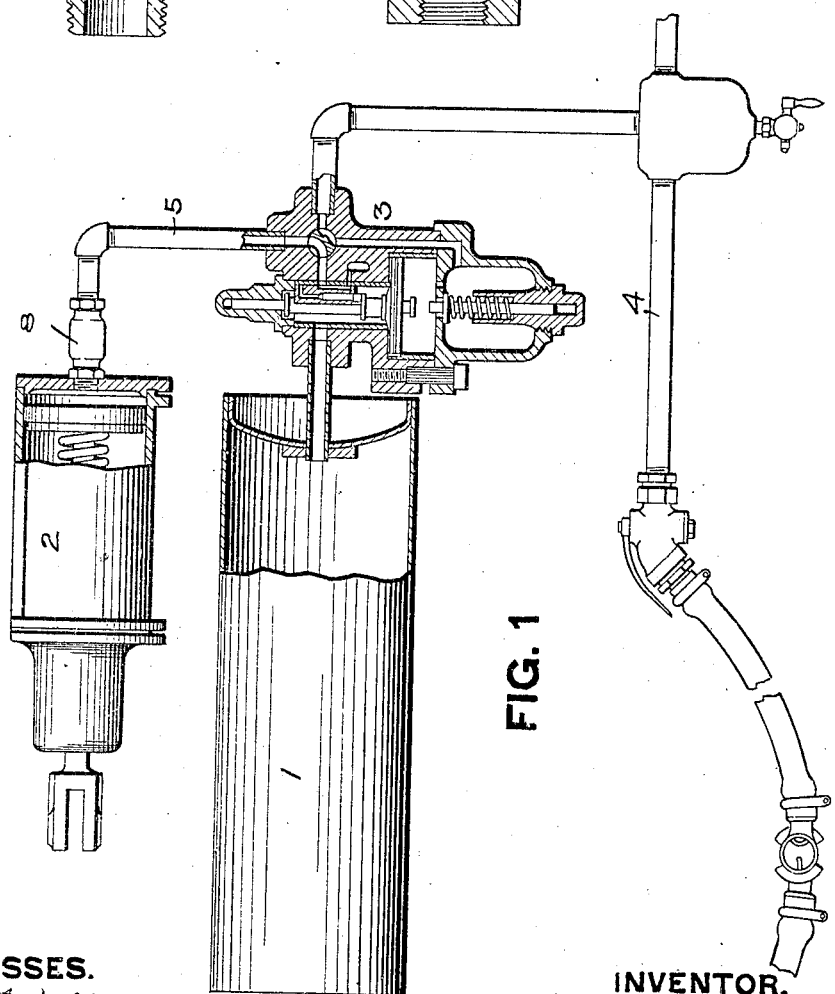
WITNESSES. INVENTOR.

No. 852,007. PATENTED APR. 30, 1907.
R. J. WILSON.
AIR BRAKE APPARATUS.
APPLICATION FILED NOV. 16, 1905.
2 SHEETS—SHEET 2.
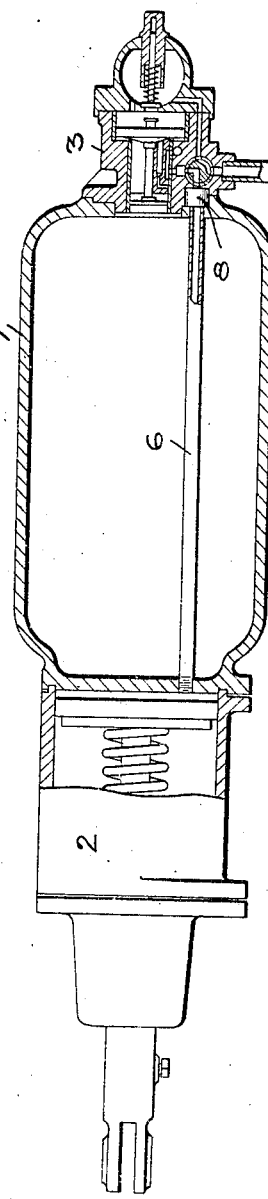
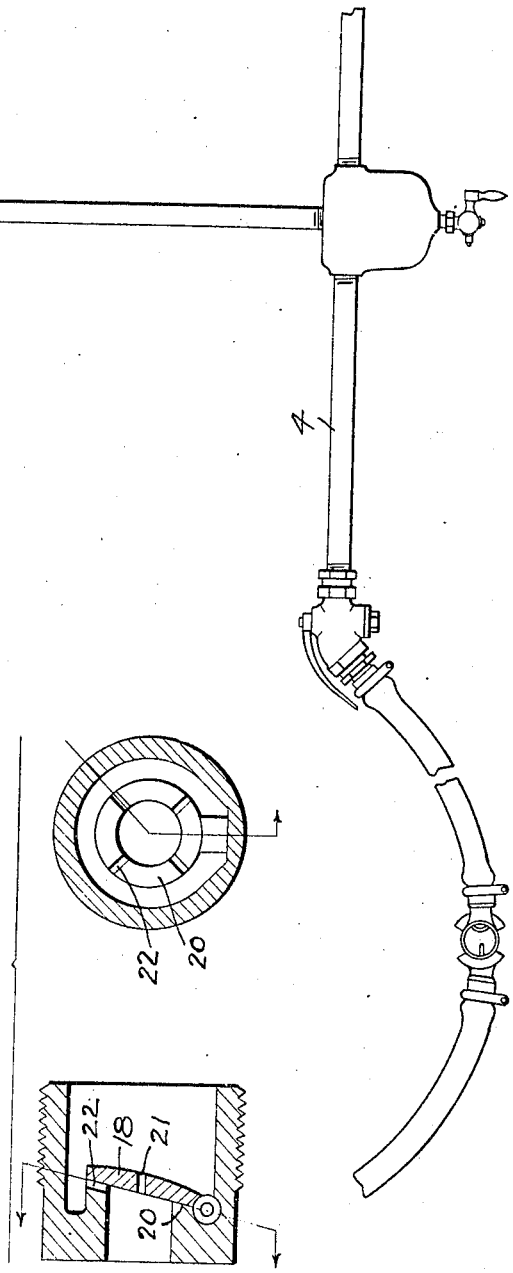
WITNESSES.
INVENTOR.

UNITED STATES PATENT OFFICE.

ROBERT J. WILSON, OF PITTSBURG, PENNSYLVANIA.

AIR-BRAKE APPARATUS.

No. 852,007.  Specification of Letters Patent.  Patented April 30, 1907.

Application filed November 16, 1905. Serial No. 287,664.

*To all whom it may concern:*

Be it known that I, ROBERT J. WILSON, a resident of Pittsburg, in the county of Allegheny and State of Pennsylvania, have invented a new and useful Improvement in Air-Brake Apparatus; and I do hereby declare the following to be a full, clear, and exact description thereof.

This invention relates to air-brake systems and the object is to prevent the severe application of the brakes which occurs when the train pulls apart or the train pipe or hose bursts or is broken from any cause.

In all automatic air-brake systems, the brakes are applied by a reduction in train pipe pressure, and the strength of the application depends upon the rapidity of reducing train pipe pressure. When a train pulls apart or a hose bursts, the air escapes very rapidly and effects a very sudden and severe application of the brakes. The brakes of the cars adjacent to the break are put on so quickly that said cars are checked to such an extent that the remaining cars of the train in pushing against them are liable to buckle and throw themselves off the track. Many very serious wrecks have been due to this cause.

The object of my invention is to prevent wrecks from the cause stated, and this I accomplish by placing in the system, and preferably between the auxiliary reservoir and brake cylinder, a suitable throttling valve preferably in the form of a regulating check valve which will restrict a sudden rush of air from the auxiliary reservoir into the brake cylinder and prevent the too severe application of the brakes.

In the accompanying drawings, Figure 1 is a diagrammatic view of a passenger car equipment showing my invention applied thereto; Fig. 2 is a similar view illustrating a freight car equipment with my invention applied; and Figs. 3, 4 and 5 are sectional views of different forms of regulating check valves.

In the drawings is shown the standard Westinghouse automatic brake equipment, but my invention is applicable to any form of automatic brake system. The drawings show the usual auxiliary reservoir 1, brake cylinder 2, triple valve 3 and train pipe 4, connected and operating in the usual way. In the passenger car equipment the connection between the auxiliary reservoir and brake cylinder is by means of the pipe 5, located externally of these parts, while in the freight car equipment the connection from the auxiliary reservoir to the cylinder is by means of the pipe 6, extending through the auxiliary reservoir. As my invention necessitates no change either in the construction, connection or mode of operation of these parts, I do not deem it necessary to explain the same, further than to say that when the train pipe pressure is reduced the triple valve moves over to admit air from the auxiliary reservoir to the brake cylinder.

In carrying my invention into effect, I place an automatically acting throttling valve 8 in the connection between the auxiliary reservoir and brake cylinder. The exact location of this valve is immaterial as long as it is in the connection specified. In Fig. 1 it is shown located on or adjacent to the end of the brake cylinder, while in Fig. 2 it is located between the triple valve and auxiliary reservoir wall. Any other location would answer my purpose equally as well.

The valve may be of any one of various constructions which will act to throttle or regulate the flow of air from the auxiliary reservoir to the brake-cylinder, and which is operated by a sudden rush of air from the reservoir to the cylinder. In Figs. 3, 4 and 5, I have shown three different forms of valves which will answer this purpose, but without attempting to illustrate all forms of valves suitable for the purpose. The valve shown in Fig. 3 comprises a suitable casing 10, having therein a seat 11, with which co-operates a ball check valve 12. The latter is guided by tapering ribs 13, which are so shaped and positioned that normally the valve will by gravity assume the full line position shown; that is, leaving the connection open. The free space around the valve is sufficient so that the amount of air necessary for normal applications of the brakes can pass freely around the valve, but when an excess rush of air occurs, as happens when the triple valve is moved suddenly to emergency application position, this valve will be carried by the rush of air against the seat 11. A suitable by-pass will be provided through the valve or around the seat, such as by cutting grooves 14 in said seat, which will permit sufficient air to pass the regulating check valve into the brake cylinder to apply the brakes with a service application.

The valve shown in Fig. 4 has substantially the same casing as that shown in Fig. 3, and is provided with a suitable seat $11^a$ for the disk valve $12^a$. The latter is provided with a stem 15, passing through suitable guides 16, for guiding the movements of the valve, and is held normally from its seat by means of a spring 17. The valve is provided with the by-pass ports, notches or grooves 14ª. Its operation is similar to that of the valve shown in Fig. 3. Normally the spring 17 holds the valve from its seat, but upon a heavy rush of air the valve will be seated against the tension of the spring, thus throttling the passage to the brake cylinder.

The valve shown in Fig. 5 is an ordinary flap valve 18 adapted to close against a seat 20. This valve may be provided with a by-pass port 21, or the seat may be provided with the by-pass grooves 22, or both. The valve when closed is slightly out of perpendicular position, as shown, so that normally it will fall by gravity to open position. When the sudden heavy rush of air comes it will be carried against the seat, thus throttling the passage to the brake cylinder.

Many other forms of valves will readily suggest themselves for the purpose specified. In all cases the valve will remain open under all normal working of the brakes, but upon a sudden heavy rush of air will close against the seat, thus throttling the passage to the brake cylinder and preventing the severe application of the brakes, with the disastrous results which would follow.

What I claim is:

1. In an air brake system, the combination of an auxiliary reservoir, brake cylinder and triple valve, and an automatically acting ball valve in the passage from the auxiliary reservoir to the brake cylinder and seating toward the brake cylinder, said valve being normally open and arranged to throttle said connection on an excess rush of air.

2. In an air-brake system, the combination of an auxiliary reservoir, brake cylinder and triple valve, and a valve in the connection between the auxiliary reservoir and brake cylinder and operable by an excess rush of air to throttle said connection independently of the movement of the brake cylinder piston.

3. In an air-brake system, the combination of an auxiliary reservoir, brake cylinder and triple valve, and a valve in the connection between the auxiliary reservoir and brake cylinder arranged to seat toward the brake cylinder, said valve being normally open and being arranged to throttle said connection by an excess rush of air independently of the movement of the brake cylinder piston.

4. In an air-brake system, the combination of an auxiliary reservoir, brake cylinder and triple valve, and a regulating check valve in the connection between the auxiliary reservoir and brake cylinder, said valve being arranged to remain normally open and to partially close said connection by an excess rush of air independently of the movement of the brake cylinder piston.

5. In an air brake system, the combination of an auxiliary reservoir, brake cylinder and triple valve, and an automatically acting check valve in the passage from the auxiliary reservoir to the brake cylinder and seating toward the brake cylinder, said check valve being normally arranged to open by gravity and to move toward its closed position on an excess rush of air.

6. In an air brake system, the combination of an auxiliary reservoir, brake cylinder and triple valve, and a ball valve in the connection between the reservoir and the brake cylinder, said valve being arranged to remain normally open and to partially close said connection upon an excess rush of air.

In testimony whereof, I the said ROBERT J. WILSON have hereunto set my hand.

ROBERT J. WILSON.

Witnesses:
ROBERT C. TOTTEN,
J. R. KELLER.